United States Patent [19]

Keller

[11] Patent Number: 5,318,616
[45] Date of Patent: Jun. 7, 1994

[54] PLUNGER MECHANISM WITH A HALL SENSOR MOVEMENT DETECTION DEVICE FOR A GLASSWARE FORMING MACHINE

[75] Inventor: René Keller, Zurich, Switzerland

[73] Assignee: Emhart Glass Machinery Investments Inc., Wilmington, Del.

[21] Appl. No.: 953,469

[22] Filed: Sep. 29, 1992

[30] Foreign Application Priority Data

Oct. 9, 1991 [GB] United Kingdom ............ 9121367

[51] Int. Cl.⁵ .................... C03B 11/06; G01D 5/12
[52] U.S. Cl. .................................. 65/158; 65/319; 65/322; 65/362
[58] Field of Search ............. 65/158, 160, 214, 215, 65/318, 319, 320, 321, 322, 362, 29

[56] References Cited

U.S. PATENT DOCUMENTS

| | | | |
|---|---|---|---|
| 3,180,718 | 4/1965 | Wilhelm | 65/318 |
| 3,192,027 | 6/1965 | Wilhelm | 65/29 |
| 4,582,522 | 4/1986 | Merz et al. | 65/29 |
| 4,613,352 | 9/1986 | Krumme et al. | 65/158 |
| 4,662,923 | 5/1987 | Vajda et al. | 65/29 |
| 5,139,559 | 8/1992 | Kozora | 65/319 |

FOREIGN PATENT DOCUMENTS

| | | |
|---|---|---|
| 0177693 | 4/1986 | European Pat. Off. . |
| 3907944 | 9/1990 | Fed. Rep. of Germany . |
| 2573200 | 5/1986 | France . |
| 2617546 | 1/1989 | France . |
| 2021770 | 12/1979 | United Kingdom . |

Primary Examiner—W. Gary Jones
Assistant Examiner—Steven P. Griffin
Attorney, Agent, or Firm—Spencer T. Smith

[57] ABSTRACT

A piston rod of a piston and cylinder device has an axial bore through which a fixed non-ferromagnetic monitoring member extends, and a detection insert of ferromagnetic materially extending generally axially of the monitoring member. A magnetic circuit is created through a base of the cylinder, a sidewall, the piston and the detection insert, and movement of the piston is detected by a Hall sensor which detects a change of flux in the magnetic circuit.

3 Claims, 2 Drawing Sheets

PLUNGER MECHANISM WITH A HALL SENSOR MOVEMENT DETECTION DEVICE FOR A GLASSWARE FORMING MACHINE

BACKGROUND OF THE INVENTION

The present invention is concerned with detecting the movement of a piston head and piston rod in a piston and cylinder device.

There are many circumstances in which piston and cylinder devices, which may be pneumatically or hydraulically operated, are utilized to move parts in machines and in which it is desired to know the precise position of the piston head and piston rod in the cylinder. Various types of transducer have been proposed for monitoring such position, but frequently suffer from disadvantages, for example bulk, fragility or undue sensitivity to hostile environments.

Glassware forming machines are particularly good examples of machines in which a hostile environment may affect transducers which are used to monitor the movement of parts.

It is one of the objects of the present invention to provide an improved piston and cylinder device having means for monitoring the position of the piston and piston rod.

STATEMENT OF THE INVENTION

The present invention provides a piston and cylinder device comprising a cylinder having a wall, a first end portion and a second end portion, a piston rod having an axial bore therethrough, a piston head mounted on the piston rod in the cylinder, a monitoring member of non-ferromagnetic material fixed to the first end portion of the cylinder and extending through the axial bore towards the second end portion of the cylinder, said monitoring member comprising a detection insert of ferromagnetic material extending generally axially of the monitoring member, a Hall sensor and a magnet in the first end portion of the cylinder so that a magnetic circuit is established through the detection insert, the first end portion of the cylinder, the Hall sensor, the wall of the cylinder and the piston head and movement of the piston head alters the flux in the circuit and is thus detected by the Hall sensor.

Preferably the detection insert comprises a surface which is inclined at a small angle to the surface of the monitoring member. Preferably the detection insert is of uniform cross section.

One particular mechanism in a glass machine in which accurate monitoring of movement is particularly required is in the movement of a parison forming plunger at a blank station of a glassware forming machine. Movement of the plunger not only gives an indication of the formation of a parison at the station but can be used, for example, to control the amount of glass in a gob fed to the station for forming into a parison.

The present invention also provides a plunger mechanism for the formation of parisons in a glassware forming machine comprising a piston and cylinder device as set out as above wherein the piston and piston rod are connected to the plunger and air for cooling the plunger and the mechanism is passed through an axial bore of the monitoring member.

DETAILED DESCRIPTION

A preferred embodiment of the invention will now be described with reference to the accompanying drawings in which.

Figure 1:
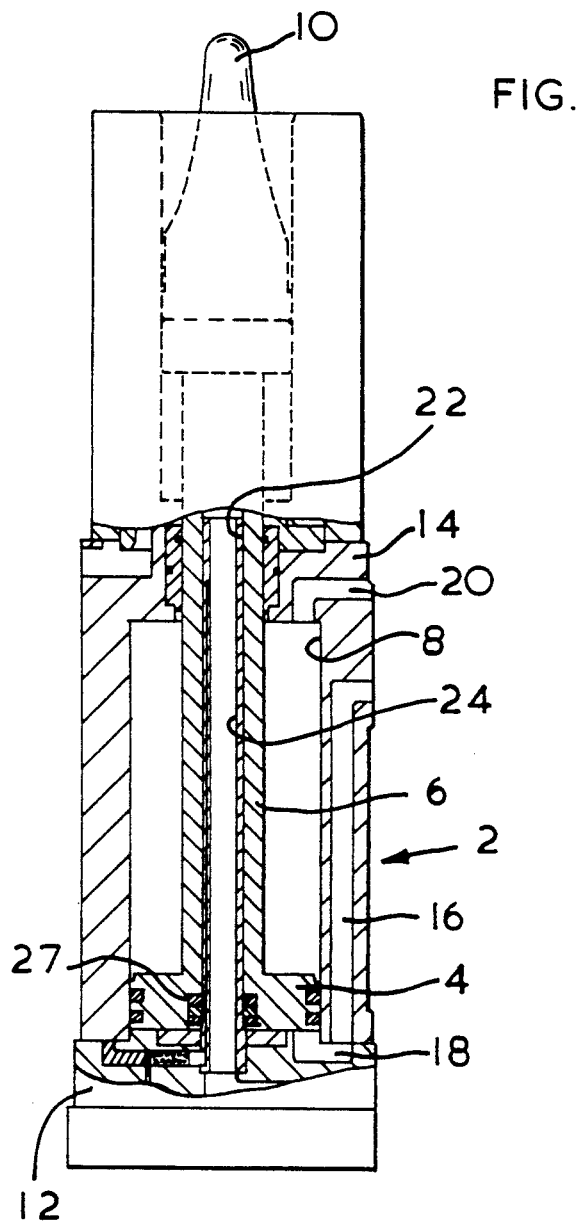
FIG. 1 shows a plunger mechanism of a glass container making machine, largely in cross section
Figure 3:
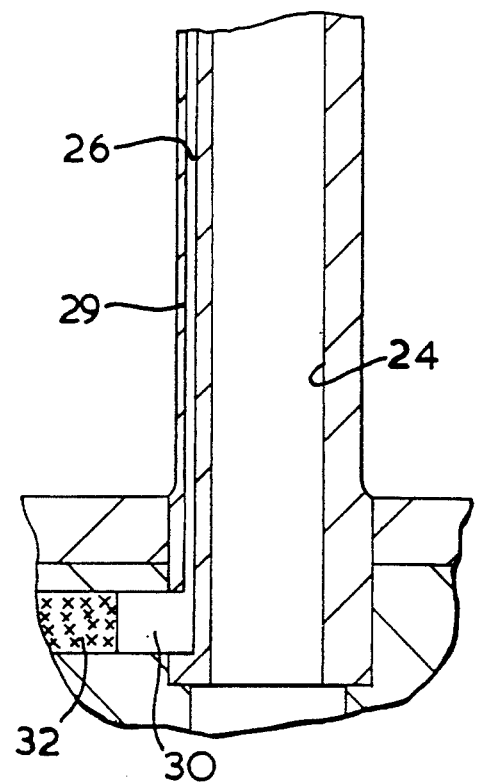
FIG. 3 shows one portion of FIG. 2 on an even larger scale.
Figure 2:
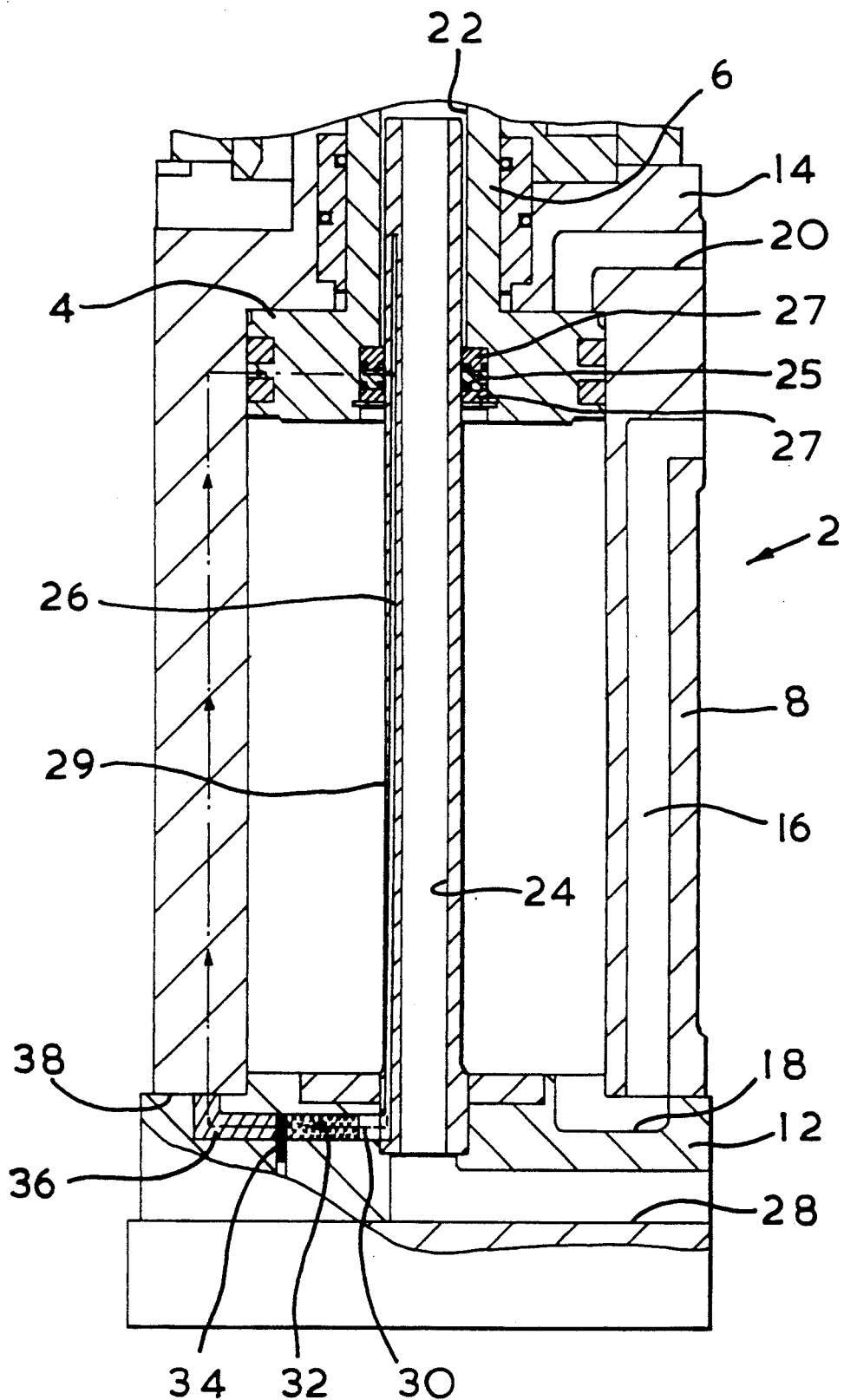
FIG. 2 shows certain parts of FIG. 1 on a larger scale.

The illustrative plunger mechanism comprises a piston and cylinder device 2 comprising a piston head 4 mounted on a piston rod 6 and movable in a cylinder 8. A plunger 10 is mounted on the piston rod 6 and is moved in its operation by the piston and cylinder device 2.

The cylinder 8 comprises a lower end cap 12 and is closed at its upper end by an end wall 14. A passage 16 through a wall portion of the cylinder 8 leads to a groove 18 in the end cap 12 through which compressed air may be provided to a lower end of the cylinder 8. A further passage 20 is provided in the end wall 14 through which air may be provided to an upper end of the cylinder 8.

The piston rod 6 has an axial bore 22 extending through it and a monitoring member in the form of a tube 24 is secured in the end cup 12 and positioned in the bore 22: cooling air may be supplied to the plunger 10 in the operation of the plunger mechanism through the tube 24. Sealing rings 25 secured between collars of magnetic material 27 act between the bore 22 in the piston head to prevent the passage of air between the tube 24 and the bore 22. A passage way 28 is provided in the end cap 12 through which cooling air may be provided to the tube 24.

The tube 24 is made from non-magnetic material, preferably electrolytic chromium. Mounted in the wall of the tube 24 is a detection insert in the form of a strip 26 of magnetic material, preferably electrolytic nickel. The strip 26 is of uniform cross section, and extends generally axially in a wall portion of the tube 24 at a slight angle to the axis of the tube 24, so that at the lower end of the tube it is close to the outer surface of the tube 24, but an upper end of the strip 26, which extends beyond the end wall 14, the strip is spaced inwardly from the outer surface of the tube 24. Thus an outer surface 29 of the strip 26 is inclined at a small angle to the outer surface of the tube 24.

A block 30 of ferro-magnetic material is secured in the end cap 12 in contact with a lower end of the strip 26. The end cap 12 is itself made of non-ferro magnetic material, e.g. chromium. A permanent magnet 32 is in contact with the block 30, and a Hall sensor 34 is positioned between the magnet 32 and a further block 36 of ferro magnetic material mounted in the cap 12 and in close contact with an end face 38 of the cylinder 8. The cylinder 8 itself is made of ferro magnetic material, e.g. steel.

It can be seen that in the arrangement just described, a magnetic circuit is provided which extends from one end of the magnet 32, through the sensor 34, the block 36, the wall of the cylinder 8, the piston head 4 (which is also of ferro-magnetic material), the collars 27, a thin portion of the non-ferro magnetic wall of the tube 24, the strip 26 and the block 30.

It can be seen that, as the piston 4 moves upwards in the cylinder 8, not only is the length of the magnetic circuit increased, but also the thickness of the non-magnetic material in the circuit between the collars 27 and the strip 26 increases. Thus the magnetic flux in the circuit produced by the magnet 32 will alter, and thus movement of the piston will produce an appropriate signal from the Hall sensor.

Sensing of the movement of the piston can, as is known, be used to control penetration of the plunger into glass in a parison mould in the formation of a parison and also to monitor gob size.

Compensation for temperature variations in the Hall sensor can be obtained by the use of a second Hall sensor not in the magnetic circuit, which is subject to the same temperature variation as the sensor in the circuit and is connected thereto in a bridge circuit.

It will be realized that variations may be made of the illustrative device. In particular, the strip 26 may be replaced by a strip which tapers in thickness, being thicker at the bottom than the top, if even greater sensitivity is required. Further, if less sensitivity is acceptable, the strip 26 may be replaced by a strip of uniform thickness which has its longitudinal faces parallel to the wall of the tube 24.

What is claimed is:

1. A plunger mechanism for a glass container making machine comprising
    a cylinder including
        a vertically extending cylindrical side wall having a bottom surface and a cylindrical vertically extending inner surface, and
        a bottom cap for supporting said cylindrical sidewall, said bottom cap made from non ferromagnetic material,
    a cooling tube made of non ferromagnetic material, said cooling tube being open at a top and having a bottom portion secured to said bottom cap so that said cooling tube extends axially vertically upwardly within said cylindrical side wall,
    said cooling tube supporting a ferromagnetic strip which extends axially from a location proximate the top of said cooling tube to said bottom portion and extends through said bottom portion, and
    annular piston head means made of ferromagnetic material, telescopically displaceable relative to said cooling tube along said cylindrical inner surface,
    said side wall made of ferromagnetic material for defining a flux path from the bottom surface of said side wall to said piston head means,
    said piston head means defining a flux path from said sidewall to said ferromagnetic strip,
    said ferromagnetic strip defining a flux path from said piston head means to said bottom cap, and
    said bottom cap comprising means for defining a flux path from said ferromagnetic strip to said cylindrical side wall including a permanent magnet, and an adjacent Hall sensor.

2. A plunger mechanism according to claim 1, wherein said piston head means comprises an annular piston head and annular seal rings supported by said piston head adjacent said cooling tube.

3. A plunger mechanism according to claim 2, wherein said means for defining a flux path from said ferromagnetic strip to said cylindrical side wall further comprises a first block of ferromagnetic material extending between said Hall sensor and said bottom surface of said side wall and a second block of ferromagnetic material extending between said permanent magnet and said ferromagnetic strip.

* * * * *